US008050990B2

(12) United States Patent
Welter et al.

(10) Patent No.: US 8,050,990 B2
(45) Date of Patent: Nov. 1, 2011

(54) METHOD OF AND SYSTEM FOR GENERATING PURCHASE ORDERS USING AN AUCTION PROCESS

(75) Inventors: Markus Welter, Ottweiler (DE); Holger Wittmer, Riegelsberg (DE)

(73) Assignee: SAP AG (DE)

( * ) Notice: Subject to any disclaimer, the term of this patent is extended or adjusted under 35 U.S.C. 154(b) by 1215 days.

(21) Appl. No.: 10/981,384

(22) Filed: Nov. 4, 2004

(65) Prior Publication Data
US 2005/0197949 A1 Sep. 8, 2005

Related U.S. Application Data

(60) Provisional application No. 60/563,284, filed on Apr. 16, 2004, provisional application No. 60/551,221, filed on Mar. 8, 2004.

(51) Int. Cl.
*G06Q 40/00* (2006.01)
(52) U.S. Cl. .......................................... 705/35; 705/37
(58) Field of Classification Search .................... 705/26, 705/37
See application file for complete search history.

(56) References Cited

U.S. PATENT DOCUMENTS

| | | | |
|---|---|---|---|
| 4,750,119 A | 6/1988 | Cohen et al. |
| 4,752,877 A | 6/1988 | Roberts et al. |
| 5,297,250 A | 3/1994 | Leroy et al. |
| 5,313,392 A | 5/1994 | Temma et al. |
| 5,315,508 A | 5/1994 | Bain et al. |
| 5,325,304 A | 6/1994 | Aoki |
| 5,400,253 A | 3/1995 | O'Connor |
| 5,500,513 A | 3/1996 | Langhans et al. |
| 5,615,109 A | 3/1997 | Eder |
| 5,621,201 A | 4/1997 | Langhans et al. |
| 5,710,578 A | 1/1998 | Beauregard et al. |
| 5,758,327 A | 5/1998 | Gardner et al. |
| H1743 H | 8/1998 | Graves et al. |
| 5,796,614 A | 8/1998 | Yamada |
| 5,832,496 A | 11/1998 | Anand et al. |
| 5,870,716 A | 2/1999 | Sugiyama et al. |
| 5,878,400 A | 3/1999 | Carter |
| 5,920,846 A | 7/1999 | Storch et al. |
| 5,930,769 A | 7/1999 | Rosengard |
| 5,930,771 A | 7/1999 | Stapp |

(Continued)

FOREIGN PATENT DOCUMENTS
JP       2004-030343 A       1/2004
(Continued)

OTHER PUBLICATIONS

U.S. Appl. No. 60/374,892, filed Apr. 22, 2002, Krajec.

(Continued)

*Primary Examiner* — James Kramer
*Assistant Examiner* — James Vezeris
(74) *Attorney, Agent, or Firm* — Foley & Lardner LLP

(57) ABSTRACT

A method of generating a purchase order includes receiving purchasing data for the item to be purchased in a computerized system and generating the purchase order based on received purchasing data for the item to be purchased, determining whether a sufficient amount of funds is available for the purchase order, submitting the purchase order for a remedial action to obtain the sufficient amount of funds if the sufficient amount of funds is not available, determining a supplier for the item to be purchased from a plurality of potential suppliers using an automated auction system if a sufficient amount of funds is available, and modifying the purchase order to include data from the automated auction regarding the supplier.

26 Claims, 10 Drawing Sheets

U.S. PATENT DOCUMENTS

| | | | |
|---|---|---|---|
| 5,943,652 A | 8/1999 | Sisley et al. | |
| 5,953,707 A | 9/1999 | Huang et al. | |
| 5,999,914 A | 12/1999 | Blinn et al. | |
| 6,014,648 A | 1/2000 | Brennan | |
| 6,029,139 A | 2/2000 | Cunningham et al. | |
| 6,064,984 A | 5/2000 | Ferguson et al. | |
| 6,115,690 A | 9/2000 | Wong | |
| 6,151,588 A | 11/2000 | Tozzoli et al. | |
| 6,185,550 B1 | 2/2001 | Snow et al. | |
| 6,260,024 B1* | 7/2001 | Shkedy | 705/37 |
| 6,285,916 B1 | 9/2001 | Kadaba et al. | |
| 6,341,351 B1 | 1/2002 | Muralidhran et al. | |
| 6,366,890 B1 | 4/2002 | Usrey | |
| 6,473,794 B1 | 10/2002 | Guheen et al. | |
| 6,484,149 B1 | 11/2002 | Jammes et al. | |
| 6,505,093 B1 | 1/2003 | Thatcher et al. | |
| 6,507,851 B1 | 1/2003 | Fujiwara et al. | |
| 6,647,380 B1 | 11/2003 | Yotsukura | |
| 6,671,676 B1 | 12/2003 | Shacham | |
| 6,701,299 B2 | 3/2004 | Kraisser et al. | |
| 6,721,715 B2 | 4/2004 | Nemzow | |
| 6,725,204 B1 | 4/2004 | Gusley | |
| 6,868,528 B2 | 3/2005 | Roberts | |
| 6,910,017 B1 | 6/2005 | Woo et al. | |
| 6,980,966 B1 | 12/2005 | Sobrado et al. | |
| 7,016,859 B2 | 3/2006 | Whitesage | |
| 7,080,030 B2 | 7/2006 | Eglen et al. | |
| 7,082,408 B1 | 7/2006 | Baumann et al. | |
| 7,082,426 B2 | 7/2006 | Musgrove et al. | |
| 7,092,929 B1 | 8/2006 | Dvorak et al. | |
| 7,096,189 B1 | 8/2006 | Srinivasan | |
| 7,107,268 B1 | 9/2006 | Zawadzki et al. | |
| 7,117,165 B1 | 10/2006 | Adam et al. | |
| 7,124,098 B2 | 10/2006 | Hopson et al. | |
| 7,124,984 B2 | 10/2006 | Yokouchi et al. | |
| 7,139,731 B1 | 11/2006 | Alvin | |
| 7,188,080 B1 | 3/2007 | Walker et al. | |
| 7,216,086 B1 | 5/2007 | Grosvenor et al. | |
| 7,283,975 B2 | 10/2007 | Broughton | |
| 7,343,315 B2 | 3/2008 | Wittmer et al. | |
| 7,346,656 B2 | 3/2008 | Worthen | |
| 7,499,877 B2 | 3/2009 | Carr et al. | |
| 7,516,083 B1 | 4/2009 | Dvorak et al. | |
| 7,523,048 B1 | 4/2009 | Dvorak | |
| 7,574,383 B1* | 8/2009 | Parasnis et al. | 705/28 |
| 7,647,250 B2 | 1/2010 | Abo-Hasna et al. | |
| 7,660,742 B2 | 2/2010 | Biwer et al. | |
| 7,693,749 B2 | 4/2010 | Wittmer et al. | |
| 7,742,948 B2 | 6/2010 | Welter et al. | |
| 7,805,335 B2 | 9/2010 | Wittmer et al. | |
| 7,813,949 B2 | 10/2010 | Grendel et al. | |
| 7,831,487 B2 | 11/2010 | Abo-Hasna et al. | |
| 7,853,491 B2 | 12/2010 | Wittmer et al. | |
| 2001/0011295 A1 | 8/2001 | Kobayashi et al. | |
| 2001/0013731 A1 | 8/2001 | Shinohara et al. | |
| 2001/0019332 A1 | 9/2001 | Fisher | |
| 2001/0019778 A1 | 9/2001 | Gardaz et al. | |
| 2001/0032130 A1 | 10/2001 | Gabos et al. | |
| 2001/0034673 A1 | 10/2001 | Yang et al. | |
| 2001/0039517 A1 | 11/2001 | Kawakatsu | |
| 2001/0049634 A1 | 12/2001 | Stewart | |
| 2002/0012390 A1 | 1/2002 | Kim | |
| 2002/0013731 A1 | 1/2002 | Bright et al. | |
| 2002/0019778 A1 | 2/2002 | Isaacson et al. | |
| 2002/0023500 A1 | 2/2002 | Chikuan et al. | |
| 2002/0026368 A1 | 2/2002 | Carter, III | |
| 2002/0048369 A1 | 4/2002 | Ginter et al. | |
| 2002/0059108 A1 | 5/2002 | Okura et al. | |
| 2002/0059122 A1 | 5/2002 | Inoue et al. | |
| 2002/0062314 A1 | 5/2002 | Hisasue et al. | |
| 2002/0072986 A1 | 6/2002 | Aram | |
| 2002/0073114 A1 | 6/2002 | Nicastro et al. | |
| 2002/0078159 A1 | 6/2002 | Petrogiannis et al. | |
| 2002/0099563 A1 | 7/2002 | Adendorff et al. | |
| 2002/0099579 A1 | 7/2002 | Stowell et al. | |
| 2002/0107713 A1 | 8/2002 | Hawkins | |
| 2002/0111892 A1* | 8/2002 | Sharp et al. | 705/37 |
| 2002/0116241 A1 | 8/2002 | Sandhu et al. | |
| 2002/0120523 A1 | 8/2002 | Yang | |
| 2002/0120533 A1 | 8/2002 | Wiesenmaier | |
| 2002/0123930 A1 | 9/2002 | Boyd et al. | |
| 2002/0128946 A1 | 9/2002 | Chehade et al. | |
| 2002/0138290 A1 | 9/2002 | Metcalfe et al. | |
| 2002/0138360 A1 | 9/2002 | Inoue et al. | |
| 2002/0143644 A1* | 10/2002 | Tosun et al. | 705/26 |
| 2002/0143690 A1 | 10/2002 | Mahajan et al. | |
| 2002/0147622 A1 | 10/2002 | Drolet et al. | |
| 2002/0147668 A1 | 10/2002 | Smith et al. | |
| 2002/0152128 A1 | 10/2002 | Walch et al. | |
| 2002/0156858 A1 | 10/2002 | Hunter | |
| 2002/0165782 A1 | 11/2002 | Falkenstein et al. | |
| 2002/0184116 A1 | 12/2002 | Tam et al. | |
| 2002/0188499 A1 | 12/2002 | Jenkins et al. | |
| 2002/0188524 A1 | 12/2002 | Shimizu | |
| 2003/0023500 A1 | 1/2003 | Boies et al. | |
| 2003/0028393 A1 | 2/2003 | Coulston et al. | |
| 2003/0028437 A1 | 2/2003 | Grant et al. | |
| 2003/0033231 A1 | 2/2003 | Turner et al. | |
| 2003/0046120 A1 | 3/2003 | Hoffman et al. | |
| 2003/0046195 A1 | 3/2003 | Mao | |
| 2003/0050852 A1 | 3/2003 | Liao et al. | |
| 2003/0065574 A1 | 4/2003 | Lawrence | |
| 2003/0074269 A1 | 4/2003 | Viswanath | |
| 2003/0083961 A1 | 5/2003 | Bezos et al. | |
| 2003/0120528 A1 | 6/2003 | Kruk et al. | |
| 2003/0126024 A1 | 7/2003 | Crampton et al. | |
| 2003/0128392 A1 | 7/2003 | O'Brien et al. | |
| 2003/0144916 A1 | 7/2003 | Mumm et al. | |
| 2003/0149578 A1 | 8/2003 | Wong | |
| 2003/0149631 A1 | 8/2003 | Crampton et al. | |
| 2003/0149674 A1 | 8/2003 | Good et al. | |
| 2003/0158791 A1 | 8/2003 | Gilberto et al. | |
| 2003/0171998 A1 | 9/2003 | Pujar et al. | |
| 2003/0172007 A1 | 9/2003 | Helmolt et al. | |
| 2003/0187767 A1 | 10/2003 | Crites et al. | |
| 2003/0200150 A1 | 10/2003 | Westcott et al. | |
| 2003/0200156 A1 | 10/2003 | Roseman et al. | |
| 2003/0200168 A1 | 10/2003 | Cullen, III et al. | |
| 2003/0208365 A1 | 11/2003 | Avery et al. | |
| 2003/0217024 A1 | 11/2003 | Kocher | |
| 2003/0229502 A1 | 12/2003 | Woo | |
| 2003/0236721 A1 | 12/2003 | Plumer et al. | |
| 2004/0006522 A1 | 1/2004 | Keane et al. | |
| 2004/0010463 A1 | 1/2004 | Hahn-Carlson et al. | |
| 2004/0015367 A1 | 1/2004 | Nicastro et al. | |
| 2004/0019528 A1 | 1/2004 | Broussard et al. | |
| 2004/0098358 A1 | 5/2004 | Roediger | |
| 2004/0122689 A1 | 6/2004 | Dailey et al. | |
| 2004/0158507 A1 | 8/2004 | Meek, Jr. et al. | |
| 2004/0162763 A1 | 8/2004 | Hoskin et al. | |
| 2004/0172321 A1 | 9/2004 | Vemula et al. | |
| 2004/0186763 A1 | 9/2004 | Smith | |
| 2004/0186765 A1 | 9/2004 | Kataoka | |
| 2004/0186783 A1 | 9/2004 | Knight et al. | |
| 2004/0210489 A1 | 10/2004 | Jackson et al. | |
| 2004/0220861 A1 | 11/2004 | Morciniec et al. | |
| 2004/0249722 A1 | 12/2004 | Sugamura et al. | |
| 2004/0267674 A1 | 12/2004 | Feng et al. | |
| 2005/0015303 A1 | 1/2005 | Dubin et al. | |
| 2005/0055283 A1 | 3/2005 | Zarovinsky | |
| 2005/0060270 A1 | 3/2005 | Ramakrishnan | |
| 2005/0075915 A1 | 4/2005 | Clarkson | |
| 2005/0075941 A1 | 4/2005 | Jetter et al. | |
| 2005/0086122 A1 | 4/2005 | Cirulli et al. | |
| 2005/0086125 A1 | 4/2005 | Cirulli et al. | |
| 2005/0096122 A1 | 5/2005 | Nireki et al. | |
| 2005/0096963 A1 | 5/2005 | Myr et al. | |
| 2005/0102175 A1 | 5/2005 | Dudat et al. | |
| 2005/0102192 A1 | 5/2005 | Gerrits et al. | |
| 2005/0102227 A1 | 5/2005 | Solonchev | |
| 2005/0131807 A1 | 6/2005 | Schaefer et al. | |
| 2005/0165659 A1 | 7/2005 | Gruber | |
| 2005/0171825 A1 | 8/2005 | Denton et al. | |
| 2005/0197912 A1 | 9/2005 | Wittmer et al. | |
| 2005/0197913 A1 | 9/2005 | Grendel et al. | |
| 2005/0197914 A1 | 9/2005 | Welter et al. | |
| 2005/0197915 A1 | 9/2005 | Biwer et al. | |

| | | | |
|---|---|---|---|
| 2005/0197918 A1 | 9/2005 | Wittmer et al. |
| 2005/0197921 A1 | 9/2005 | Abo-Hasna et al. |
| 2005/0197949 A1 | 9/2005 | Welter et al. |
| 2005/0203813 A1 | 9/2005 | Welter et al. |
| 2005/0216325 A1 | 9/2005 | Ziad et al. |
| 2005/0216357 A1 | 9/2005 | Wittmer et al. |
| 2005/0216359 A1 | 9/2005 | Welter et al. |
| 2005/0216375 A1 | 9/2005 | Grendel et al. |
| 2005/0235020 A1 | 10/2005 | Gabelmann et al. |
| 2005/0240488 A1 | 10/2005 | Grendel et al. |
| 2005/0243792 A1 | 11/2005 | Simon et al. |
| 2005/0246482 A1 | 11/2005 | Gabelmann et al. |
| 2005/0251734 A1 | 11/2005 | Gabelmann et al. |
| 2006/0015417 A1 | 1/2006 | Wittmer et al. |
| 2006/0020512 A1 | 1/2006 | Lucas et al. |
| 2006/0036507 A1 | 2/2006 | Pujar et al. |
| 2006/0074746 A1 | 4/2006 | Kline et al. |
| 2006/0074747 A1 | 4/2006 | Kline et al. |
| 2006/0074748 A1 | 4/2006 | Kline et al. |
| 2006/0074749 A1 | 4/2006 | Kline et al. |
| 2006/0074751 A1 | 4/2006 | Kline et al. |
| 2006/0112099 A1 | 5/2006 | Musgrove et al. |
| 2006/0184401 A1 | 8/2006 | DelGaudio et al. |
| 2007/0050272 A1 | 3/2007 | Godlewski et al. |
| 2010/0049582 A1 | 2/2010 | Abo-Hasna et al. |
| 2010/0100455 A1 | 4/2010 | Song |

FOREIGN PATENT DOCUMENTS

| | | |
|---|---|---|
| WO | WO 99/45450 | 9/1999 |
| WO | WO 99/45450 A2 | 9/1999 |
| WO | WO 01/71635 A2 | 9/2001 |

OTHER PUBLICATIONS

Abraham et al., "An Implemented System for Improving Promotion Productivity Using Store Scanner Data", Marketing Science, Summer 1993, vol. 12, No. 3, pp. 248-269.

Anon., "(A Lot of) Life After H. Ross: Electronic Data Systems", *Financial World*, vol. 162, No. 22, Nov. 9, 1993 (p. 50(2)).

"Beyond Markdown Management", summer/autumn 03, the 4caster, Issue 4, vol. 2, 4 pages.

Brown, "The Effects of Assortment Composition Flexibility on Operating Efficiency", (Abstract Only), *Dissertation Abstracts Int'l.*, vol. 55/08-A, available at least by 1994, (p. 2458).

"Retailers Manage Markdown Challenges Using i2 Solutions", Jan. 13, 2003, NFR 92nd Annual Convention & Expo, 2 pages.

Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.

Jensen et al., "Long-Term Construction Contracts: The Impact of Tamra '88 on Revenue Recognition", *Journal of Construction Education*, Spring 1997, vol. 2, No. 1, pp. 37-53.

Kelkar et al., Price Modeling in Standards for Electronic Product Catalogs Based on XML, 2002, pp. 366-375.

Melcher, "Local tech firm creates retail markdown tool", Mar. 24, 2000, Cincinnati Business Courier, 3 pages.

Profitlogic, available at http://webarchive.org/web/2002060311838/, available at least by Apr. 15, 2005, 22 pages.

Srinivasan et al., Concepts and strategy guidelines for designing value enhancing sales promotions, Journal of Product and Brand Management, vol. 7, No. 5, 1998, pp. 410-420.

Subrahmanyan et al., "Developing optimal pricing and inventory policies for retailers who face uncertain demand", Journal of Retailing, vol. 72, No. 1, Spring, 1996, 15 pages.

Wilson, "Changing the Process of Production", *Industrial Management*, vol. 37, No. 1, Jan./Feb. 1995 (pp. 1-2).

"New Pegasystems Enterprise Application Provides Central Hub for Proactively Managing Operational Exceptions,"Business Wire,(recovered from Dialog database), Feb. 3, 2004, 4 pages.

Bartle et al., "A Review of State Procurement and Contracting," Journal of Public Procurement, 2003, vol. 3, Issue 2, pp. 192-214.

Camas, Yuksel, "APS System Integration: More Challenges [Advanced Planned & Scheduling]," Materials Management and Distribution, Jan. 2001, 2 pages.

Chen et al., "Near-Optimal Pricing and Replenishment Strategies for a Retail/Distribution System," Operations Research, Nov./Dec. 2001, vol. 49, No. 6, pp. 839-853.

Chen et al., "Quantity and Due Date Quoting Available to Promise," Information Systems Frontier, Dec. 2001, vol. 3, No. 4, pp. 477-488.

Goodwin, David R., "The Open-to-Buy System and Accurate Performance Measurement," International Journal of Retail & Distribution Management, Mar./Apr. 1992, vol. 20, Iss. 2, 7 pages.

Notice of Allowance for U.S. Appl. No. 10/903,867, mail date Feb. 17, 2010, 6 pages.

Notice of Allowance for U.S. Appl. No. 10/914,614, mail date Oct. 3, 2007, 6 pages.

Notice of Allowance for U.S. Appl. No. 10/914,614, mail date Jan. 25, 2008, 7 pages.

Notice of Allowance for U.S. Appl. No. 10/932,913, mail date Nov. 16, 2009, 17 pages.

Notice of Allowance for U.S. Appl. No. 10/932,913, mail date Sep. 30, 2009, 26 pages.

Notice of Allowance for U.S. Appl. No. 10/933,127, mail date Feb. 4, 2010, 11 pages.

Notice of Allowance for U.S. Appl. No. 11/071,982, mail date Aug. 10, 2009, 15 pages.

Notice of Allowance for U.S. Appl. No. 11/075,391, mail date Aug. 31, 2009, 18 pages.

Office Action for U.S. Appl. No. 10/903,467, mail date Feb. 3, 2010, 16 pages.

Office Action for U.S. Appl. No. 10/903,467, mail date Jan. 26, 2009, 17 pages.

Office Action for U.S. Appl. No. 10/903,467, mail date Jul. 23, 2009, 17 pages.

Office Action for U.S. Appl. No. 10/903,467, mail date Jun. 11, 2008, 15 pages.

Office Action for U.S. Appl. No. 10/903,467, mail date Mar. 27, 2007, 11 pages.

Office Action for U.S. Appl. No. 10/903,867, mail date Aug. 19, 2008, 10 pages.

Office Action for U.S. Appl. No. 10/903,867, mail date Feb. 25, 2008, 9 pages.

Office Action for U.S. Appl. No. 10/903,867, mail date Mar. 16, 2009, 9 pages.

Office Action for U.S. Appl. No. 10/903,867, mail date Oct. 7, 2009, 9 pages.

Office Action for U.S. Appl. No. 10/903,902, mail date Apr. 23, 2008, 9 pages.

Office Action for U.S. Appl. No. 10/903,902, mail date Aug. 7, 2008, 8 pages.

Office Action for U.S. Appl. No. 10/903,902, mail date Feb. 12, 2009, 2 pages.

Office Action for U.S. Appl. No. 10/903,902, mail date Mar. 22, 2007, 7 pages.

Office Action for U.S. Appl. No. 10/903,902, mail date Sep. 13, 2007, 8 pages.

Office Action for U.S. Appl. No. 10/915,263, mail date Apr. 12, 2010, 14 pages.

Office Action for U.S. Appl. No. 10/915,263, mail date Apr. 14, 2009, 12 pages.

Office Action for U.S. Appl. No. 10/915,263, mail date Apr. 28, 2008, 16 pages.

Office Action for U.S. Appl. No. 10/915,263, mail date Jul. 23, 2007, 15 pages.

Office Action for U.S. Appl. No. 10/915,263, mail date Sep. 12, 2008, 11 pages.

Office Action for U.S. Appl. No. 10/915,263, mail date Sep. 9, 2009, 13 pages.

Office Action for U.S. Appl. No. 10/915,707, mail date Apr. 13, 2009, 6 pages.

Office Action for U.S. Appl. No. 10/915,707, mail date Apr. 21, 2006, 9 pages.

Office Action for U.S. Appl. No. 10/915,707, mail date Aug. 28, 2006, 13 pages.

Office Action for U.S. Appl. No. 10/915,707, mail date Dec. 8, 2008, 5 pages.

Office Action for U.S. Appl. No. 10/915,707, mail date Mar. 16, 2010, 13 pages.
Office Action for U.S. Appl. No. 10/915,707, mail date Mar. 28, 2007, 13 pages.
Office Action for U.S. Appl. No. 10/915,707, mail date May 1, 2008, 14 pages.
Office Action for U.S. Appl. No. 10/915,707, mail date Sep. 14, 2009, 11 pages.
Office Action for U.S. Appl. No. 10/932,913, mail date Apr. 1, 2009, 15 pages.
Office Action for U.S. Appl. No. 10/932,913, mail date Aug. 27, 2007, 14 pages.
Office Action for U.S. Appl. No. 10/932,913, mail date Jan. 23, 2007, 15 pages.
Office Action for U.S. Appl. No. 10/932,913, mail date Mar. 20, 2008, 14 pages.
Office Action for U.S. Appl. No. 10/932,913, mail date Nov. 16, 2009, 17 pages.
Office Action for U.S. Appl. No. 10/932,913, mail date Sep. 17, 2008, 14 pages.
Office Action for U.S. Appl. No. 10/933,127, mail date Aug. 3, 2009, 26 pages.
Office Action for U.S. Appl. No. 10/933,127, mail date Jul. 16, 2008, 10 pages.
Office Action for U.S. Appl. No. 10/933,127, mail date Jul. 3, 2007, 5 pages.
Office Action for U.S. Appl. No. 10/933,127, mail date Nov. 28, 2007, 7 pages.
Office Action for U.S. Appl. No. 10/981,384, mail date Apr. 29, 2009, 10 pages.
Office Action for U.S. Appl. No. 11/047,368, mail date Dec. 12, 2007, 15 pages.
Office Action for U.S. Appl. No. 11/047,368, mail date Jul. 24, 2008, 18 pages.
Office Action for U.S. Appl. No. 11/047,368, mail date Jun. 26, 2007, 14 pages.
Office Action for U.S. Appl. No. 11/047,368, mail date Mar. 4, 2009, 16 pages.
Office Action for U.S. Appl. No. 11/047,368, mail date Nov. 10, 2009, 14 pages.
Office Action for U.S. Appl. No. 11/071,982, mail date Feb. 13, 2009, 18 pages.
Office Action for U.S. Appl. No. 11/071,982, mail date Jan. 25, 2008, 19 pages.
Office Action for U.S. Appl. No. 11/071,982, mail date May 29, 2008, 20 pages.
Office Action for U.S. Appl. No. 11/071,982, mail date Nov. 18, 2008, 7 pages.
Office Action for U.S. Appl. No. 11/072,000 mail date Jul. 17, 2008, 6 pages.
Office Action for U.S. Appl. No. 11/072,000, mail date Dec. 9, 2008, 10 pages.
Office Action for U.S. Appl. No. 11/072,000, mail date Jun. 11, 2009, 13 pages.
Office Action for U.S. Appl. No. 11/072,000, mail date Nov. 12, 2009, 9 pages.
Office Action for U.S. Appl. No. 11/074,368, mail date Apr. 14, 2009, 13 pages.
Office Action for U.S. Appl. No. 11/074,368, mail date Aug. 19, 2009, 12 pages.
Office Action for U.S. Appl. No. 11/074,368, mail date Mar. 26, 2008, 12 pages.
Office Action for U.S. Appl. No. 11/074,368, mail date Mar. 29, 2007, 11 pages.
Office Action for U.S. Appl. No. 11/074,368, mail date Mar. 30, 2010, 13 pages.
Office Action for U.S. Appl. No. 11/074,368, mail date Oct. 6, 2006, 8 pages.
Office Action for U.S. Appl. No. 11/074,600, mail date Feb. 18, 2009, 25 pages.
Office Action for U.S. Appl. No. 11/074,600, mail date Feb. 3, 2010, 29 pages.
Office Action for U.S. Appl. No. 11/074,600, mail date Jul. 16, 2009, 27 pages.
Office Action for U.S. Appl. No. 11/074,600, mail date Sep. 8, 2008, 13 pages.
Office Action for U.S. Appl. No. 11/075,391, mail date Apr. 8, 2008, 5 pages.
Office Action for U.S. Appl. No. 11/075,391, mail date Dec. 11, 2008, 9 pages.
Office Action for U.S. Appl. No. 11/075,391, mail date May 22, 2009, 9 pages.
Office Action for U.S. Appl. No. 11/075,392, mail date Apr. 8, 2008, 14 pages.
Office Action for U.S. Appl. No. 11/075,392, mail date Dec. 9, 2009, 13 pages.
Office Action for U.S. Appl. No. 11/075,392, mail date May 12, 2009, 13 pages.
Office Action for U.S. Appl. No. 11/075,392, mail date Nov. 13, 2008, 15 pages.
Office Action for U.S. Appl. No. 11/075,393, mail date Jun. 11, 2009, 26 pages.
Office Action for U.S. Appl. No. 11/075,393, mail date May 28, 2008, 9 pages.
Office Action for U.S. Appl. No. 11/075,393, mailed Nov. 24, 2009, 24 pages.
Saad et al., "An Integrated Model for Order Release and Due-Date Demand Management," Journal of Manufacturing Technology Management, 2004, vol. 15, No. 1, 14 pages.
Staib et al., "Purchasing and Supply Chain Management," Air Force Journal of Logistics, Fall 2002, vol. 26, No. 3, 9 pages.
Der et al., "On-line scheduling of multi-server batch operations.", IIE Transactions, vol. 33, No. 7, Jul. 2001, p. 569.
Notice of Allowance for U.S. Appl. No. 10/903,467, mail date Aug. 11, 2010, 13 pages.
Notice of Allowance for U.S. Appl. No. 10/903,867, mail date May 27, 2010, 6 pages.
Notice of Allowance for U.S. Appl. No. 11/072,000, mail date Jul. 9, 2010, 12 pages.
Notice of Allowance for U.S. Appl. No. 11/075,392, mail date Jan. 5, 2011, 11 pages.
Notice of Allowance for U.S. Appl. No. 11/075,393, mail date Jun. 10, 2010, 19 pages.
Notice of Allowance for U.S. Appl. No. 11/047,368, mail date Feb. 14, 2011, 11 pages.
Notice of Allowance for U.S. Appl. No. 11/074,368, mail date Mar. 16, 2011, 6 pages.
Office Action for U.S. Appl. No. 11/047,368, mail date Jun. 16, 2010, 12 pages.
Office Action for U.S. Appl. No. 11/047,368, mail date Nov. 24, 2010, 11 pages.
Office Action for U.S. Appl. No. 11/074,368, mail date Aug. 31, 2010, 12 pages.
Office Action for U.S. Appl. No. 11/074,600, mail date Nov. 26, 2010, 27 pages.
Office Action for U.S. Appl. No. 11/075,392, mail date Aug. 4, 2010, 15 pages.
Office Action for U.S. Appl. No. 12/611,754, mail date Jan. 31, 2011, 15 pages.
Stander, Bella; "The choices for taking inventory—and control: a menu of possibilities is available to stores that want to install—or upgrade—computer inventory control systems", Publishers Weekly, Mar. 20, 1995, pp. 33(3), vol. 242, No. 12, retrieved via Dialog on Dec. 17, 2010, 10 pages.

* cited by examiner

Change View "Control Table for Grouping": Details

| Purchasing Doc. Type | NB | Standard PO |
| --- | --- | --- |

| Control Table for Grouping | |
| --- | --- |
| Take Account of Purch. Group | Each Time Document is Processed in Fashion Environment |
| Take Account of Pint | Each Time Document is Processed in Fashion Environment |
| Take Account of Contract | Each Time Document is Processed in Fashion Environment |
| Take Account of Item Categ. | Inactive |
| Take Account of Firm Deals | Each Time Document is Processed in Fashion Environment |
| Take Account of OTB Bckt | Inactive |
| Take Account of Alloc. Table | For Grouping Process |
| Take Account of Dlvy Period | Inactive |
| Take Account of Dlvy Date | Each Time Document is Processed in Fashion Environment |

| Box | No. | Item | Origin | Article (Variant, lot) | Latest PO date | Vendor | Deliverz Date GR Ramp | Price | Quantity | UoM | Site |
|---|---|---|---|---|---|---|---|---|---|---|---|
| ☐ | 12345678 | 10 | EKL | 4711100 | 13/09/2002 | 100006 | 01/03/2003 | 1000 | 100 | CAR | VZ01 |
| ☐ | 12345678 | 20 | EKL | 4711200 | 20/09/2002 | 200003 | 15/03/2003 | 500 | 10 | CAR | VZ01 |
| ☐ | 12345678 | 30 | EKL | 4713001 | 23/09/2002 | 100006 | 20/03/2003 | 69 | 1 | PC | VZ01 |
| ☐ | 12345678 | 40 | EKL | 4713002 | 23/09/2002 | 100006 | 20/03/2003 | 69 | 1 | PC | VZ01 |
| ☐ | 12345678 | 50 | EKL | 4713003 | 23/09/2002 | 100006 | 20/03/2003 | 69 | 1 | PC | VZ01 |
| ☐ | 98765432 | 10 | EKL | 4714001 | 23/09/2002 | 200004 | 30/09/2003 | 89 | 1 | PC | VZ01 |
| ☐ | 98765432 | 20 | EKL | 4714002 | 25/09/2002 | 200004 | 30/09/2003 | 89 | 1 | PC | VZ01 |
| ☐ | 98765432 | 30 | EKL | 4714003 | 25/09/2002 | 200004 | 30/09/2003 | 89 | 1 | PC | VZ01 |
| ☐ | 98765432 | 40 | EKL | 4714004 | 25/09/2002 | 200004 | 30/09/2003 | 89 | 1 | PC | VZ01 |
| ☐ | 98765432 | 50 | EKL | 4714005 | 25/09/2002 | 200004 | 30/09/2003 | 89 | 1 | PC | VZ01 |
| ☐ | 300000001 | 10 | ADH | 471500 | 23/09/2002 | 100006 | 25/06/2003 | 10 | 25 | CAR | VZ01 |
| ☐ | 300000001 | 10 | ADH | 471600 | 23/09/2002 | 100006 | 23/04/2003 | 20 | 80 | CAR | VZ01 |
| ☐ | 300000002 | 20 | ADH | 480000 | 20/10/2002 | 100006 | 23/04/2003 | 30 | 20 | PC | VZ01 |
| ☐ | 300000003 | 10 | ADH | 491200 | 20/10/2002 | 100006 | 23/04/2003 | 10 | 120 | CAR | VZ01 |

PO Manager

General Selection
- Purch. Organization ___ to ___
- Purchasing group ___ to ___
- *Latest PO Date* ___ to ___
- *Delivery date* ___ to ___
- Vendor ___ to ___
- Material ___ to ___
- Plant ___ to ___
- Plant cat. ___ to ___
- *Firm Deal* ___ to ___
- *Release Indicator* ___ to ___
- Order type ___ to ___
- ☑ MYDOC
- ☑ Order List Entries
- ☐ Grouped PO Documents
- ☐ Purchase Orders

Figure 10:
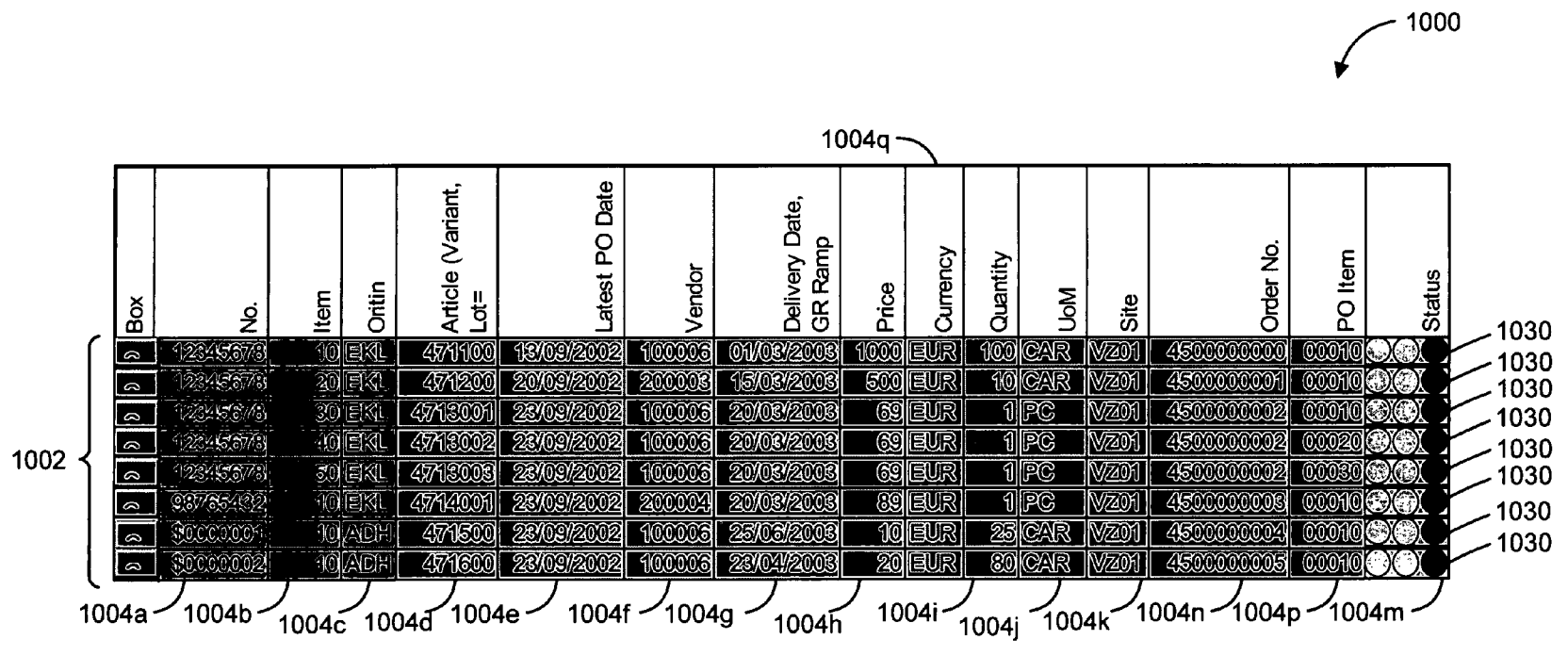

| Box | No. | Item | Ortin | Article (Variant, Lot=) | Latest PO Date | Vendor | Delivery Date, GR Ramp | Price | Currency | Quantity | UoM | Site | Order No. | PO Item | Status |
|---|---|---|---|---|---|---|---|---|---|---|---|---|---|---|---|
| ⓒ | 12345678 | 10 | EKL | 471100 | 13/09/2002 | 100006 | 01/03/2003 | 1000 | EUR | 100 | CAR | VZ01 | 4500000000 | 00010 | |
| ⓒ | 12345678 | 20 | EKL | 471200 | 20/09/2002 | 200003 | 15/03/2003 | 500 | EUR | 10 | CAR | VZ01 | 4500000001 | 00010 | |
| ⓒ | 12345678 | 30 | EKL | 471B001 | 23/09/2002 | 100006 | 20/03/2003 | 69 | EUR | 1 | PC | VZ01 | 4500000002 | 00010 | |
| ⓒ | 12345678 | 40 | EKL | 471B002 | 23/09/2002 | 100006 | 20/03/2003 | 69 | EUR | 1 | PC | VZ01 | 4500000002 | 00020 | |
| ⓒ | 12345678 | 50 | EKL | 471B003 | 23/09/2002 | 100006 | 20/03/2003 | 69 | EUR | 1 | PC | VZ01 | 4500000002 | 00030 | |
| ⓒ | 98765432 | 10 | EKL | 471400 | 23/09/2002 | 200004 | 20/03/2003 | 89 | EUR | 1 | PC | VZ01 | 4500000003 | 00010 | |
| ⓒ | 90000001 | 10 | ADH | 471500 | 23/09/2002 | 100006 | 25/06/2003 | 10 | EUR | 25 | CAR | VZ01 | 4500000004 | 00010 | |
| ⓒ | 90000002 | 10 | ADH | 471600 | 23/09/2002 | 100006 | 23/04/2003 | 20 | EUR | 80 | CAR | VZ01 | 4500000005 | 00010 | |

METHOD OF AND SYSTEM FOR GENERATING PURCHASE ORDERS USING AN AUCTION PROCESS

CROSS-REFERENCE TO RELATED PATENT APPLICATIONS

This application claims the benefit of U.S. Provisional Application No. 60/551,221, filed Mar. 8, 2004 and entitled "Inventory Management," and U.S. Provisional Application No. 60/563,284, filed Apr. 16, 2004 and entitled "Inventory Management," both of which are hereby incorporated by reference.

BACKGROUND

The present description relates generally to the field of generating and managing purchase orders. More particularly, the present invention relates to a method of and system for generating purchase orders using an auction process to determine a supplier for a retail product or service.

The retail business can require that certain purchase orders be processed in a very short amount of time, while other purchase orders must be placed in advance of the desired delivery. For example, changes in current trends in the fashion industry may require that inventory be increased on short notice. Additionally, fashion articles may require ordering well in advance of delivery, in some cases six months or more in advance. For certain aspects of the fashion industry, items may be required to be ordered one or more seasons in advance. An advantageous purchase order system must accommodate this variation in lead times of the ordered items without unnecessarily tying up funds.

Further, tracking inventory and budgets for seasonal items can be important to the profitability of a business. For example, identifying a particularly fast selling item and ordering additional quantities to arrive on time and within a prescribed budget may increase the profitability of a retail location. Accordingly, it is important for a business to carefully plan and schedule purchasing orders for retail products and services to ensure on-time procurement or scheduling within budget constraints. Optimizing the smooth flow of the procurement process increases an enterprise's efficiency and competitiveness and determines its success.

As part of the procurement process, retail businesses and service providers often seek to obtain preferential buying terms by soliciting bids or quotations from several suppliers (e.g., vendors, manufacturers, wholesalers, etc.) for a particular retail product or service. For example, a retailer in the fashion industry may solicit bids from several competing suppliers of basic fashion articles using an auction in order to select the supplier or vendor. The fashion retailer may then select the supplier whose bid provides the most favorable buying terms (e.g., pricing, delivery conditions, etc.) as the source for certain basic fashion articles. Accordingly, optimization of the smooth flow of the procurement process includes efficiently facilitating the solicitation of bids from several suppliers in order to select the best source of a retail product or service.

In view of the foregoing, it would be beneficial to provide a method of and system for generating a purchase order which uses an auction process in order to determine a supplier and price for a retail product or service.

SUMMARY

According to an exemplary embodiment, a method of generating a purchase order includes receiving purchasing data for the item to be purchased in a computerized system and generating the purchase order based on received purchasing data for the item to be purchased, determining whether a sufficient amount of funds is available for the purchase order, submitting the purchase order for a remedial action to obtain the sufficient amount of funds if the sufficient amount of funds is not available, determining a supplier for the item to be purchased from a plurality of potential suppliers using an automated auction system if a sufficient amount of funds is available, and modifying the purchase order to include data from the automated auction regarding the supplier.

According to another exemplary embodiment, a system for generating a purchase order includes means for receiving purchasing data for the item to be purchased in a computerized system, means for generating the purchase order based on received purchasing data for the item to be purchased, means for determining whether a sufficient amount of funds is available for the purchase order, means for submitting the purchase order for a remedial action to obtain the sufficient amount of funds if the sufficient amount of funds is not available, means for determining a supplier for the item to be purchased from a plurality of potential suppliers using an automated auction system if a sufficient amount of funds is available, and means for modifying the purchase order to include data from the automated auction regarding the supplier.

According to another exemplary embodiment, a program product for generating a purchase order includes machine-readable program code for causing, when executed, one or more machines to perform the method steps of receiving purchasing data for the item to be purchased in a computerized system, generating the purchase order based on received purchasing data for the item to be purchased, determining whether a sufficient amount of funds is available for the purchase order, submitting the purchase order for a remedial action to obtain the sufficient amount of funds if the sufficient amount of funds is not available, determining a supplier for the item to be purchased from a plurality of potential suppliers using an automated auction system if a sufficient amount of funds is available, and modifying the purchase order to include data from the automated auction regarding the supplier.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and:

FIG. 2 illustrates a graphical user interface screen for selecting grouping criteria according to an exemplary embodiment;

FIG. 5 illustrates the structure of a purchase order list according to an exemplary embodiment;

FIG. 7 illustrates the structure of a selection screen according to another exemplary embodiment;

FIG. 10 illustrates the structure of a purchase order list having status indicators according to another exemplary embodiment.

DETAILED DESCRIPTION

In the following description, for the purposes of explanation, numerous details are set forth in order to provide a thorough understanding of the present invention. It will be evident to one skilled in the art, however, that the exemplary embodiments may be practiced without these specific details. In other instances, structures and device are shown in diagram form in order to facilitate description of the exemplary embodiments.

Figure 1:
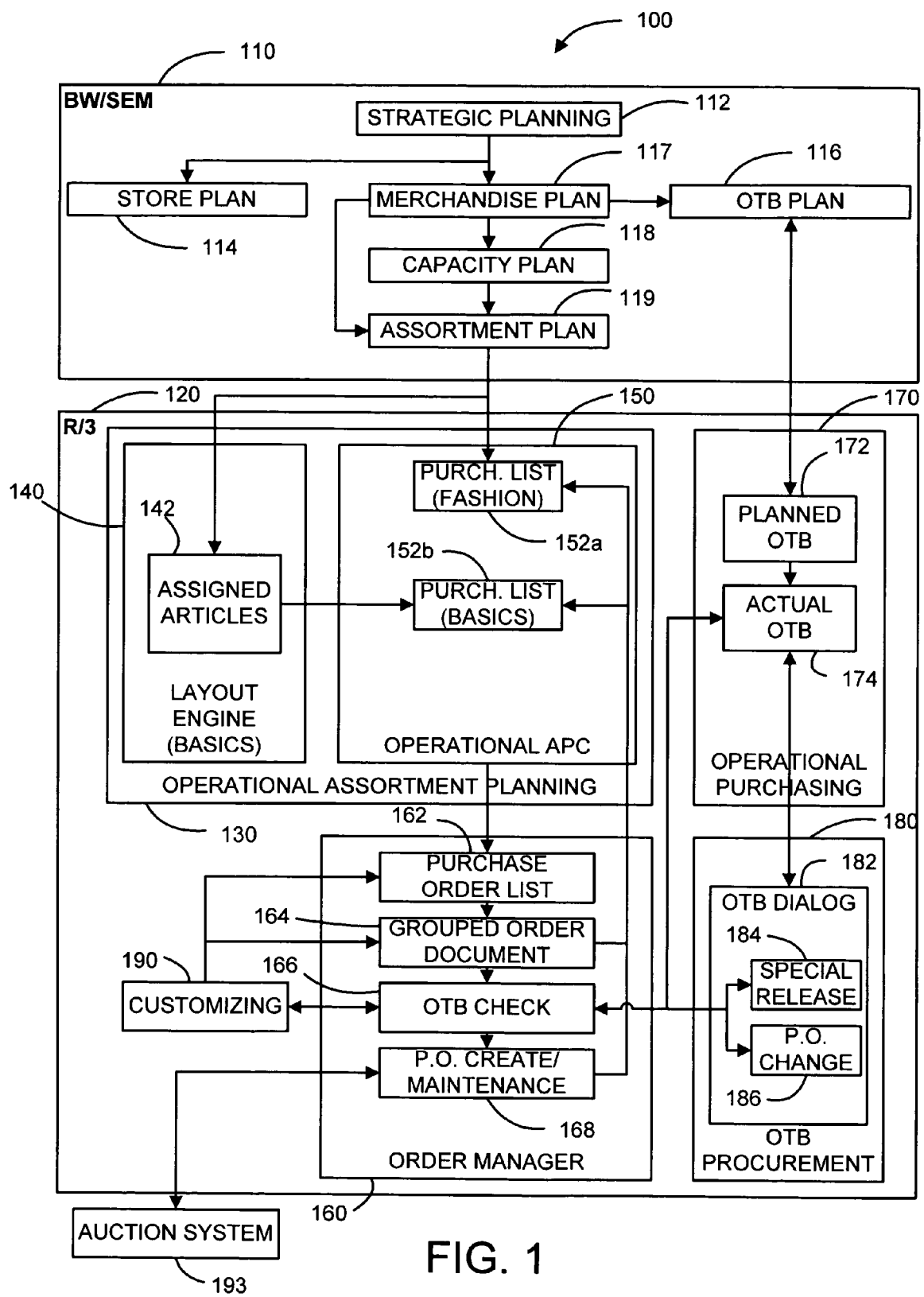
FIG. 1 is a data flow diagram illustrating a system for facilitating planning and procurement of retail sales articles and services according to an exemplary embodiment.

FIG. 1 illustrates a system 100 for facilitating planning and procurement of retail products and services according to an exemplary embodiment. System 100 is illustrated as including a back end system 110 (identified as "BW/SEM") and a front end system 120 (identified as "R/3"). In another embodiment, a single integrated system may be used in place of back end system 110 and front end system 120. System 100 may be implemented as a single system, a distributed system, or any combination thereof. System 100 may be implemented using a single computing system, a plurality of computing systems, software, hardware, or any other system or combination of systems to perform the functions described herein. System 100 may be generally used, for example, to generate and manage purchase orders for retail products and services using a purchase order list.

Back end system 110 is a data repository configured to receive, sort, process, and store retail sales data, as well as to facilitate planning, provide reporting, and provide other functions associated with managing sales data using one or more functions and/or components. For example, in the illustrated embodiment, back end system 110 includes a strategic planning function 112. Strategic planning function 112 may be used to facilitate an overall business financial plan which defines the retailer's financial goals (e.g., revenues, gross margins, etc.), planned expenses (e.g., inventory, marketing, etc.), and budgets. Accordingly, strategic planning function 112 may be used to generate a store plan 114, an "Open To Buy" (OTB) plan 116, a merchandise plan 117, a capacity plan 118, and an assortment plan 119. According to other exemplary embodiments, back end system 110 may include additional, fewer, and/or different functions.

Store plan 114 may be a plan in which revenues and costs are based on factors within a store hierarchy such as regional marketing, competition, demographic shifts and preferences, and events. OTB plan 116 is derived from merchandise plan 117 and may be a plan designed to maximize turnover potential and minimize capital investment and stockholding costs. OTB planning data may include, for example, an extrapolated amount of available budget for procuring a retail sales article.

Merchandise plan 117 may define target purchasing, sales, margin, and inventory levels that are consistent with the overall business plan. Capacity plan 118 is derived from merchandise plan 117 and may be a plan which takes into account the available shelf and/or floor space in a particular store or group of stores in order to determine an optimal number of certain types of retail sales articles to be procured for the store or group of stores.

Assortment plan 119 is based on merchandise plan 117 (and optionally on capacity plan 118 for certain articles) and may be a plan which defines ranges of retail sales articles (e.g., colors and sizes) that may be assigned to a particular grouping of stores. Assortment plan 119 may form the basis for selecting, procuring, and allocating quantities of particular retail sales articles. For example, in the illustrated embodiment, assortment planning data from assortment plan 119 is provided to front-end system 120 in order to facilitate generation and management of purchase orders for the associated retail sales articles.

Front end system 120 is communicatively coupled to back end system 110 and is similarly configured to receive, sort, process, and store retail sales data, as well as to facilitate planning, provide reporting, and provide other functions associated with managing sales data using one or more functions and/or components and in conjunction with back end system 110. For example, in the illustrated embodiment, front end system 120 includes operational assortment planning system 130, order manager system 160, operational purchasing system 170, and OTB procurement system 180. According to other exemplary embodiments, front-end system 120 may include additional, fewer, and/or different functions.

Operational assortment planning system 130 is configured to receive strategic planning data, such as merchandise plan data 117, capacity plan data 118, and assortment planning data 119, from back end system 110, to facilitate refinement and/or addition of detail to the strategic planning data (e.g., specific retail sales articles and quantities to be procured for specific stores during specific periods), and to distribute the data to other downstream processes. In the illustrated embodiment, operational assortment planning system 130 includes a layout engine 140 and an operative assortment planning and control (APC) engine 150. Data from layout engine 140 is passed on to APC engine 150 where it is processed and distributed to downstream processes.

Layout engine 140 is configured to receive strategic planning data from back end system 110, such as capacity data 118 and assortment planning data 119, and to use this data to assign, for example, certain types of retail sales articles to specific locations or layouts according to the available capacity in a store or group of stores. For example, in the illustrated embodiment, layout engine 140 may be used to assign basic, repeat, or "stackable" retail sales articles to a particular layout according to available capacities. In other embodiments, layout engine 140 may be used in conjunction with other types of retail sales articles. Layout data, such as assignments 142 of specific retail sales articles to a particular layout is then passed on to APC engine 150.

APC engine 150 is configured to receive strategic planning data from back end system 110 via an inbound interface, and/or assigned article data 142 from layout engine 140, and to determine groupings and quantities of specific retail sales articles that are to be procured during a specific period and delivered to a specific store or group of stores. By way of example, the following strategic planning data may be "pushed" (or written) or "pulled" (or read) by APC engine 150:

(i) Key performance indicator "fixed initial stock-up" (on a quantity and value basis: purchase price, sales price) at various levels (e.g., article hierarchy node, season/season year, rollout, global assortments assigned to the hierarchy node) Fixed initial stock-up represents fixed quantities of new merchandise to be procured from a capacity standpoint.

(ii) Key performance indicator "variable initial stock-up" on a quantity and value basis at the same levels. Variable initial stock-up represents quantities of new merchandise to be procured from a sales standpoint (e.g., forecast sales).

(iii) Key performance indicator "putaway quantity" on a quantity and value basis at various levels (e.g., article hierarchy node, season/season year, rollout, distribution center). Putaway quantity represents quantities of an article that are not to be shipped directly to a store, but rather are to be shipped to a distribution center first.

(iv) The number of different generic articles (or single articles) per key performance indicator in the assortments (assortment breadth).

APC engine 150 uses the strategic planning data received from back end system 110 and/or assigned article data 142 received from layout engine 140 to generate output data including planned assortments/store groups that, upon release, are pushed to downstream processes. Output data from APC engine 150 may also include one or more purchasing lists 152 of various types. For example, in the illustrated embodiment, APC engine 150 uses strategic planning data received from back end system 110 to generate one or more purchasing lists 152a for fashion retail sales articles, and uses assigned article data 142 from layout engine 140 to generate one or more purchasing lists 152b for non-fashion retail sales articles such as basics or stackable merchandise.

Purchasing list 152 is a list of retail sales articles and corresponding planned purchasing quantities for selected planning levels (e.g., article hierarchy node/season, season year/rollout/assortment type) in APC engine 150. Each purchasing list 152 includes one or more purchasing list items, which represent the smallest possible unit in each purchasing list. A purchasing list item may include a generic article, variants of the generic article (e.g., color or size ranges), or single articles. A purchasing list item may also include planned quantities that are planned within a purchasing list for a specific store delivery date for the various global assortments and key performance indicators. By way of example, each purchasing list item may include the following information:

(i) Purchasing list item number or identifier. This number allows communication between APC engine 150 and the various operative applications;

(ii) Article number or identifier;

(iii) Characteristic 1 (e.g., "article number-characteristic level"). A data retention level of this type allows APC engine 150 to save confirmed order quantities at the characteristic level and facilitates confirmation as to whether the order quantities for a certain characteristic value deviate from the planned quantities;

(iii) Market buying number. This number allows tracking of specific generic articles that may be moved from one purchasing list to another;

(iv) Prices (e.g., purchase price and sales price);

(v) Currencies (e.g., local currency, vendor currency);

(vi) "Price fixed" indicator. This indicator ensures that price determination is not performed for either the purchase or sales price during order processing;

(vii) Total purchase order quantity for articles—planned and actual quantities (for confirmations from the purchase order) and article/characteristic value;

(viii) Vendor. Where a vendor is not maintained by APC engine 150, the vendor may be determined from the purchase order list, as will be described below;

(ix) Supplying site (e.g., distribution center, location for delivery);

(x) Dates (e.g., store delivery date, distribution center delivery date, latest possible order date), planned and actual dates;

(xi) Fields for confirmations (e.g., confirmations from downstream processes); and (xii) Status fields for the purchasing list item (e.g., status information from downstream processes).

Order manager system 160 is configured to receive data from APC engine 150 in the form of released purchasing list items, and to generate a corresponding purchase order list 162. Items in purchase order list 162 for which a purchase order is to be generated are transferred to a grouped procurement document 164. In one embodiment, items in purchase order list 162 for which a purchase order is to be generated may be grouped together for transfer to grouped procurement document 164 according to selected criteria (e.g., by using a graphical user interface). Grouping criteria for creating and changing purchase orders may include grouping based on, for example, a delivery date, a delivery period, a contract, an OTB budget, a purchasing group, a plant or location, an item category, etc. An exemplary graphical user interface screen for selecting such grouping criteria is show in FIG. 2. According to an exemplary embodiment, these criteria may be modified or enhanced by a user of system 100.

Items may also be revised if necessary after transfer to a grouped procurement document 164. For example, in one embodiment, vendor determination function 191 and contract determination function 192 may be carried out for items in grouped procurement document 164 if these functions were not performed for purchase order list 162. Once an item has been transferred to the grouped procurement document 164, a confirmation is sent to APC engine 150 (e.g., as a status field for the corresponding purchasing list item) and the item is identified for removal from purchase order list 162 by setting a deletion indicator in the purchased list. Items identified for removal from purchase order list 162 remain, however, in purchasing list 152. Items transferred to grouped procurement document 164 may be returned to purchase order list 162 by removing the deletion indicator and sending another confirmation to APC engine 150. All items in purchase order list 162 that remain marked for deletion are deleted upon generation of a purchase order 168 from grouped procurement document 164.

Once grouped order document 164 has been prepared, order manager 160 performs an OTB check 166 to verify that budgeted funds are available such that a purchase order may be generated. If OTB check 166 is successful, a confirmation may be sent to APC engine 150 (e.g., as a status field for the corresponding purchasing list item) and order manager system 160 may then generate a purchase order 168. If OTB check 166 is not successful, a failure message may be sent to APC engine 150 (e.g., as a status field for the corresponding purchasing list item). The grouped purchase order document may then need to be modified and/or specially authorized such that a purchase order may be generated.

Operational purchasing system 170 is configured to perform OTB check 166 in conjunction with order manager system 160. Operational purchasing system 170 includes planned OTB data 172 and actual OTB data 174. Planned OTB data may include OTB plan data 116 received by operational purchasing system 170 from back end system 110. Operational purchasing system 170 uses planned OTB data 172 and actual OTB data 174 to determine whether budgeted funds are available such that a purchase order may be generated for a particular grouped order document 164.

OTB procurement system 180 is in communication with order manager system 160 and operational purchasing system 170 and is configured to provide options for successfully generating a purchase order for grouped procurement document 164 when OTB check 166 is not successful. For example, in the illustrated embodiment, OTB procurement system 180 includes OTB dialog 182, which provides options to either initiate a special release 184 or a purchase order change 186. When special release 184 is initiated, grouped procurement document 164 is forwarded to, for example, an appropriately authorized individual for approval. When purchase order change 186 is initiated, grouped procurement document 164 may be modified. Such modifications may include changes in quantities, changes in delivery dates, changes in price, etc.

Figure 3:
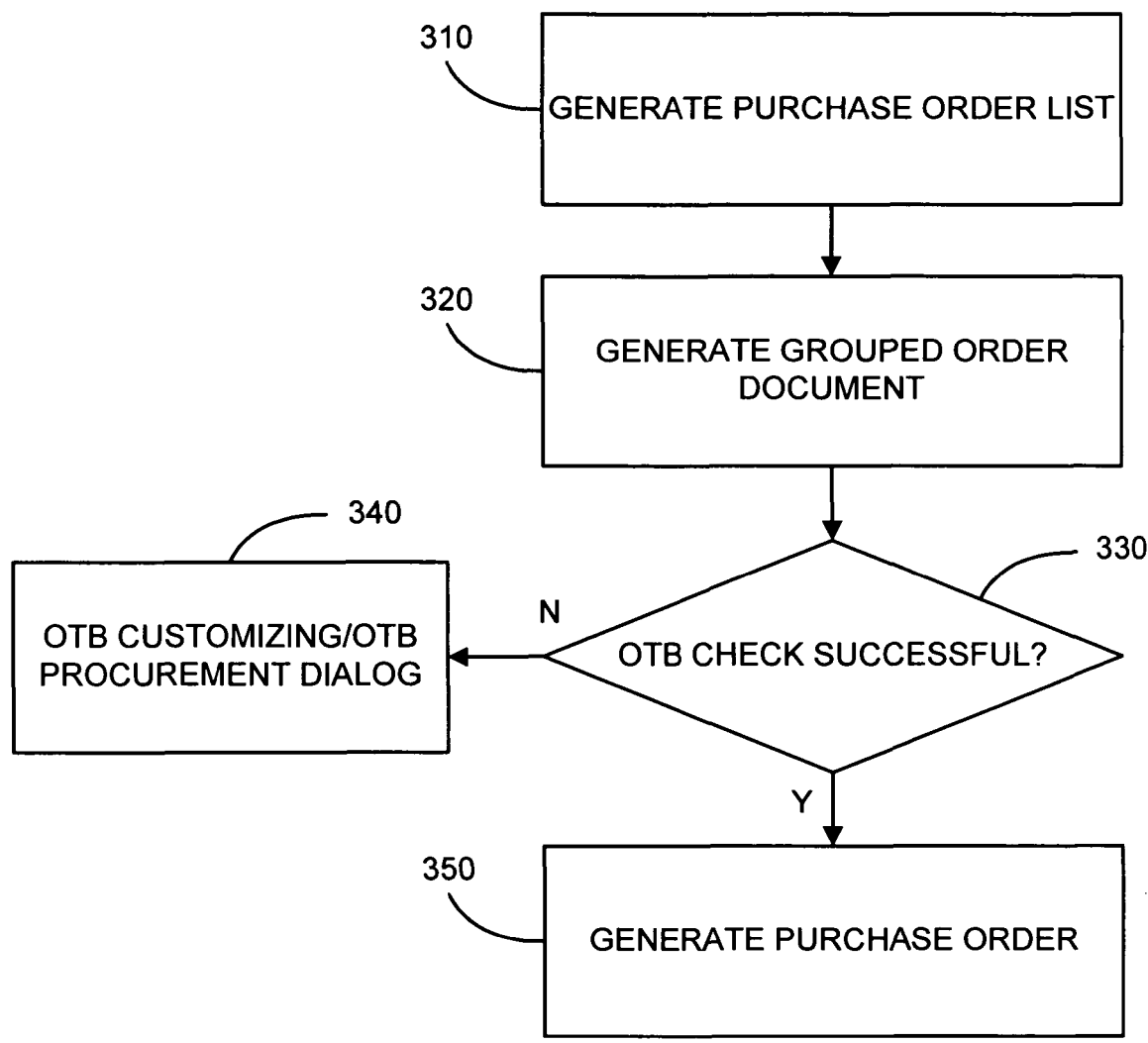
FIG. 3 is a flow diagram illustrating a method of using a purchase order list to generate a purchase order according to an exemplary embodiment.

FIG. 3 illustrates a method of using a purchase order list to generate a purchase order according to an exemplary embodiment. The method begins with a step 310. In step 310, released purchasing list items are received and a purchase order list is generated which includes a corresponding line item for each released purchasing list item. In a step 320, particular items in the purchase order list for which a purchase order is to be generated are transferred to a grouped procurement document. In a step 330, an OTB check is performed on the grouped procurement document to verify that sufficient budget is available for a purchase order to be generated. If the OTB check is not successful, the process continues with a step 340. If the OTB check is successful, the process continues with a step 350. In step 340, the grouped procurement document may be subject to modification or special approval. For example, the grouped procurement document may be subject to approval via a special release as described above, or may be subject to modifications. In one embodiment, such modifications may include changes in quantities, changes in delivery dates, changes in price, etc. In step 350, a purchase order is generated for items in the grouped procurement document.

Referring again to FIG. 1, order manager system 160 may also be configured to determine a supplier (e.g., vendors, manufacturers, wholesalers, etc.) for an item in purchase order list 162 using an auction process. For example, order manager system 160 may utilize a supplier auction system 193 configured to facilitate the automatic determination of a supplier for an item in purchase order list 162. Suitable supplier auction systems may include, for example, automated auction systems provided by TexYard Technology GmbH, Essen, Germany. Auction system 193 is configured to automatically receive bids or quotations (e.g., price, delivery day, quantity, etc.) from a plurality of different suppliers for an item to be purchased, and to use information in each bid to determine a particular supplier for the item to be purchased based on, for example, the most favorable buying terms (e.g., lowest price, fastest delivery of a specific quantity, etc.). According to an exemplary embodiment, data regarding the item in purchase order list 162 is automatically exchanged between auction system 193 and order manager system 160.

Figure 4:
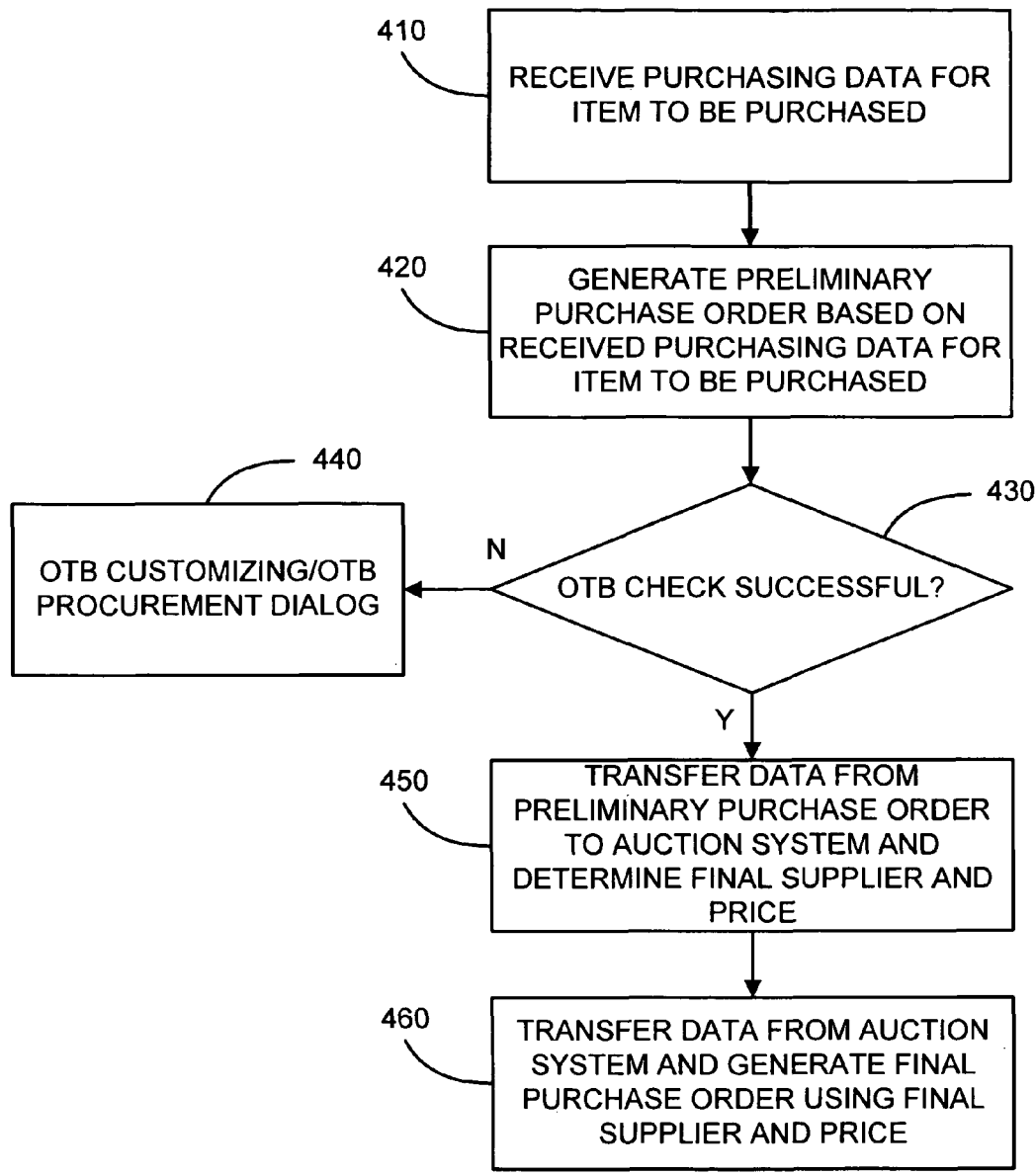
FIG. 4 is a flow diagram illustrating a method of using an automated auction process to determine a supplier for a retail product or service according to an exemplary embodiment.

FIG. 4 illustrates a method of using an automated auction process to determine a supplier for a retail product or service according to an exemplary embodiment. The auction process may generally be implemented using, for example, system 100. The method begins with a step 410. In step 410 purchasing data is received for an item to be purchased. The purchasing data is received from, for example, APC engine 150 (shown in FIG. 1). In a step 420, a preliminary purchase order is generated based on the purchasing data received in step 410. All information received in step 410 for the item to be purchased is included in the preliminary purchase order (e.g., quantity, delivery date, preliminary price, etc.). According to an exemplary embodiment, the current market price or a maximum for the item is used for the price in the preliminary purchase order, and a one-time "dummy" vendor is used for the supplier, which will be replaced after the auction.

In a step 430, an OTB check is performed for the preliminary purchase order to verify that budgeted funds are available such that a purchase order may be generated. If the OTB check is not successful, the process continues with a step 440. If the OTB check is successful, the process continues with a step 450. In step 440, the preliminary purchase order may be submitted for remedial actions in order to obtain sufficient funds, such as by modification or special approval. For example, the preliminary purchase order may be subject to approval via a special release as described above, or may be subject to modifications. According to an exemplary embodiment, such modifications may include changes in quantities, changes in delivery dates, changes in price, etc.

In step 450, data from the preliminary purchase order is transferred to an auction system, such as auction system 193 (shown in FIG. 1), and a final supplier and price are determined for the item to be purchased. The transferred data includes, for example, a price, a delivery date, etc. The auction system automatically receives bids or quotations from a plurality of different suppliers for an item to be purchased as described above, and uses information in each bid to determine the final supplier and price for the item to be purchased based on, for example, the most favorable buying terms (e.g., lowest price, fastest delivery of a specific quantity, etc.). In a step 460, data from the auction system, including the final supplier and price for the item to be purchased determined in step 450, are transferred from the auction system (e.g., transferred to order manager 160 in system 100 shown in FIG. 1), and the preliminary purchase order is updated to include this data as a final purchase order.

In this way, the method of and system for generating purchase orders using an auction process provides for the automatic determination of a supplier and price for a retail product or service to be purchased. This automated determination optimizes the smooth flow of the procurement process and facilitates procurement of more favorable buying terms, which in turn may increase an enterprise's efficiency and competitiveness.

FIG. 5 illustrates the structure of a purchase order list 500 which may be displayed to a user as part of a graphical user interface according to an exemplary embodiment. In the illustrated embodiment, purchase order list 500 is formatted as a table. Purchase order list 500 includes a header row 501 as well as a row 502 for each purchasing list item added to the purchase order list. For example, in the illustrated embodiment, purchase order list 500 includes rows 502a-502n. Purchase order list 500 also includes columns 504 for relevant purchasing data associated with each purchasing list item in the purchase order list. For example, in the illustrated embodiment, purchase order list 500 includes columns 504a-504k. Column 504a, labeled "No." in header row 501, includes the purchase list number from which the purchase order list line item was generated. For example, the purchase order list line items in rows 502a-502e were all generated from purchasing list number 12345678. Column 504b, labeled 'Item" in header row 501, includes the purchasing list line item number for each purchasing list item in the purchase order list. For example, the purchase order list line items in rows 502a-502e represent line items 10-50 from purchasing list number 12345678. Column 504c, labeled "Origin" in header row 501, includes the origin of each purchase order list line item. The origin may come from the purchase list, an external system, or may be input manually. Column 504d, labeled "Article" in header row 501, includes the specific article number for each purchase order list line item. Column 504e, labeled "Latest PO Date" in header row 501, lists the latest possible date that a purchase order may be generated for each purchase order list line item. Column 504f, labeled "Vendor" in header row 501, lists the vendor for each purchase order list line item. Column 504g, labeled "Delivery Date GR Ramp" in header row 501, includes the required delivery date for each purchase order list line item. Column 504h, labeled "Price" in header row 501, includes the price for each purchase order list line item. Column 504i, labeled "Quantity" in header row 501, includes the required quantity for each purchase order list line item. Column 504j, labeled "UoM" in header row 501, includes the appropriate unit of measure for each purchase order list line item (e.g., cartons, pieces, etc.) Column 504k, labeled "Site" in header row 501, lists the delivery destination for each purchase order list line item. Of course, in other embodiments, additional, fewer, and/or different columns and rows of information or data may be displayed.

Figure 6:
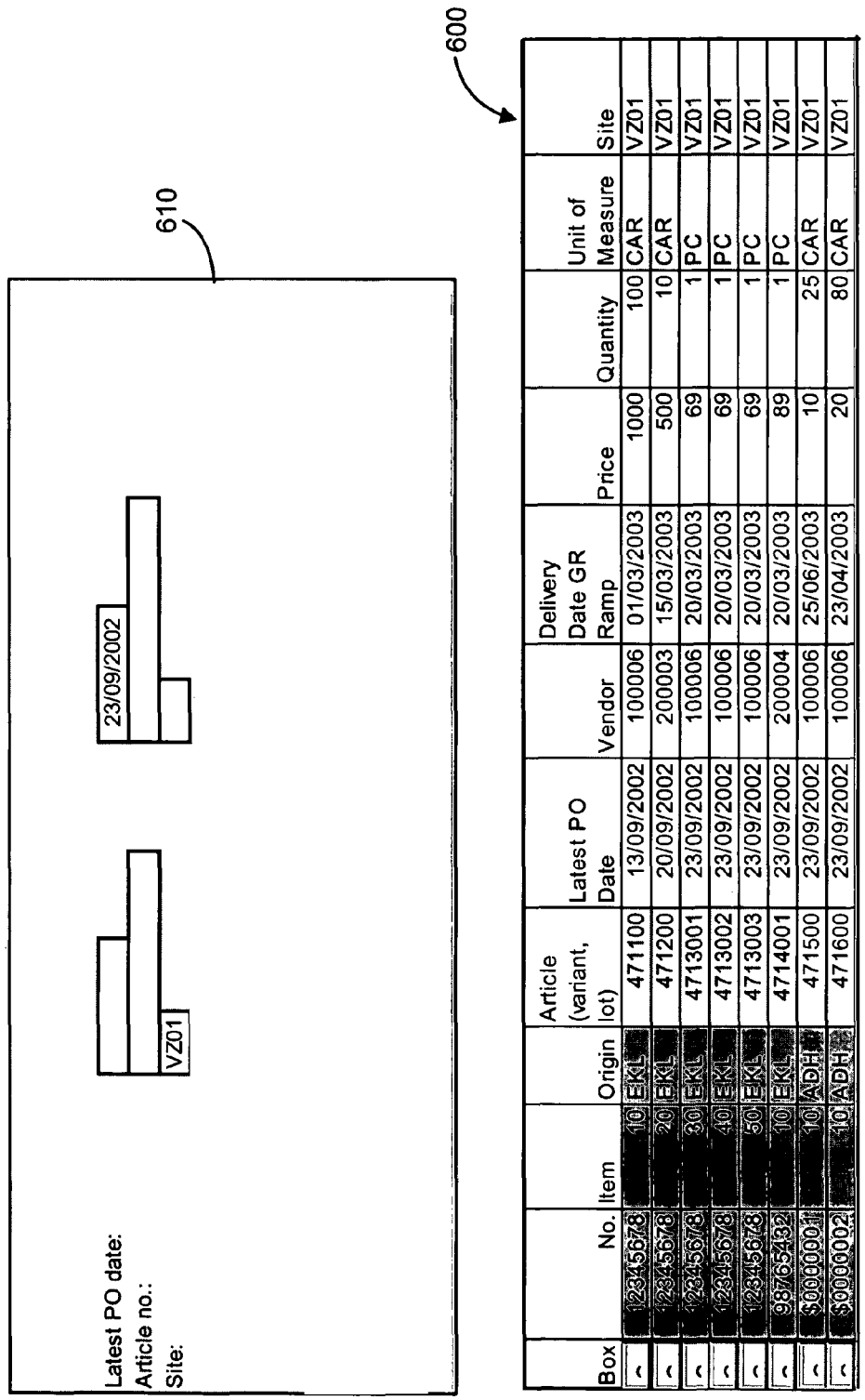
FIG. 6 illustrates the structure of a selection screen and purchase order list according to an exemplary embodiment.

Purchase order list line items may be selectively accessed and displayed. For example, FIG. 6 illustrates a purchase order list 600 and a selection screen 610 which may be displayed as part of the graphical user interface in order to facilitate the selective accessing of purchase order list line items according to specific criteria according to an exemplary embodiment. Such criteria may include categories of relevant purchasing data associated with each purchasing list item in purchase order list 600. In the illustrated embodiment, the categories "Latest PO Date," "Article No.," and "Site" may be used in selection screen 610 to selectively access purchase order list line items. For example, in the illustrated embodiment, where the Latest PO Date "Sep. 23, 2002" and the Site "VZ01" are entered in selection screen 610, purchase order list 600 is displayed including only those purchase order list line items corresponding to site VZ01 with a latest PO date prior to or on Sep. 23, 2002.

FIG. 7 illustrates a selection screen according to another exemplary embodiment. In this embodiment, additional categories include "Purchasing Organization," Purchasing Group," "Vendor," "Material," "Plant," "Plant Category," "Delivery Date," "Firm Deal," "Release Indicator," and "Order Type."

Figure 8:
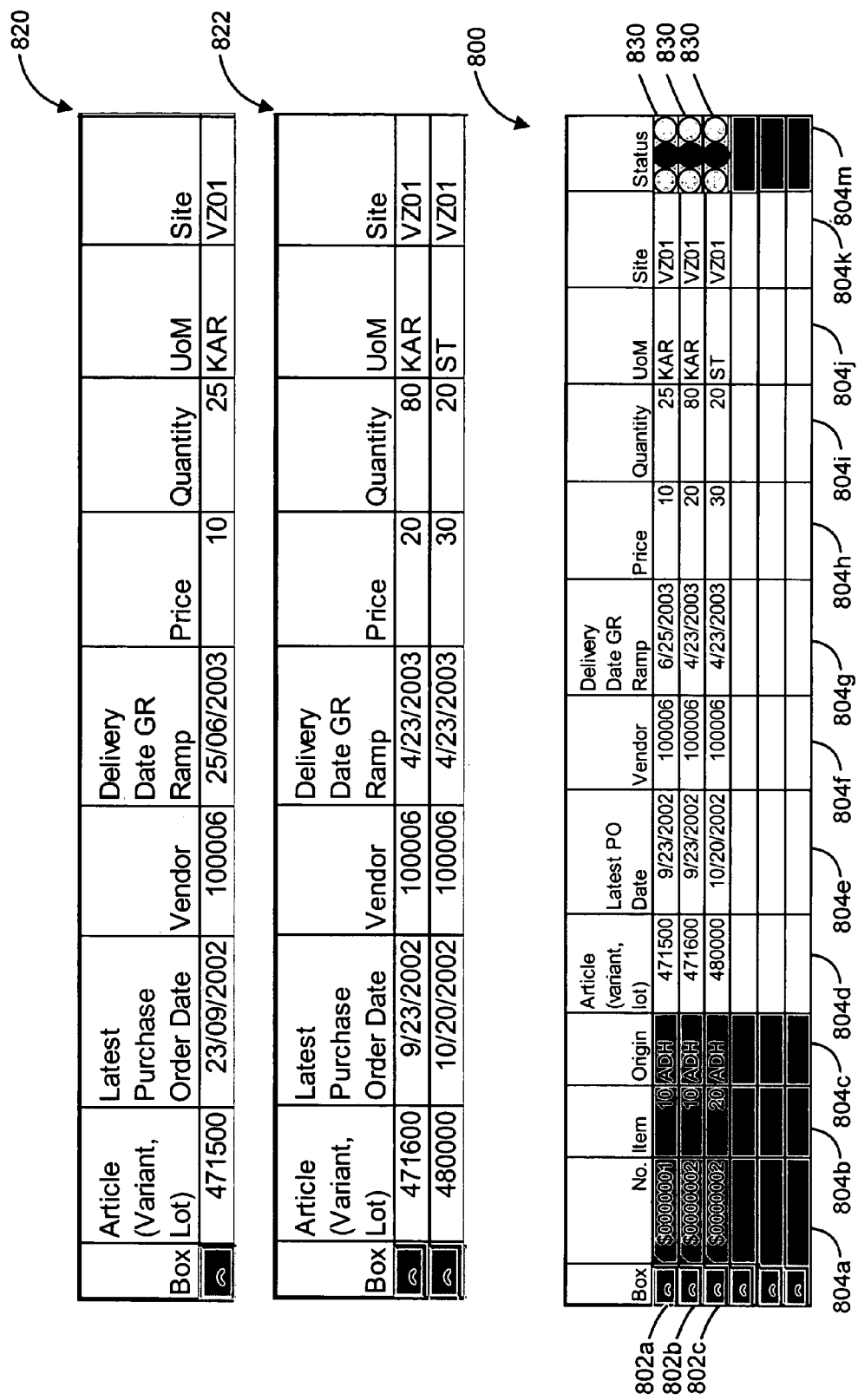
FIG. 8 illustrates the structure of a purchase order list having status indicators according to an exemplary embodiment.

FIG. 8 illustrates the structure of a purchase order list 800 having status indicators 830 for each purchase order list line item according to an exemplary embodiment. In the illustrated embodiment, purchase order list 800 includes line items 802a, 802b, and 802c, which correspond to items from entries 820 and 822 (shown for reference). When each item is entered, purchase order list 800 adds each item as a purchase order list line item with columns 804a-804k, which contain the relevant purchasing data associated with each ad-hoc item. Purchase order list 800 also includes column 804m, which may contain an individual status identifier 830 for purchase order list line items 802a, 802b, and 802c.

Figure 9:
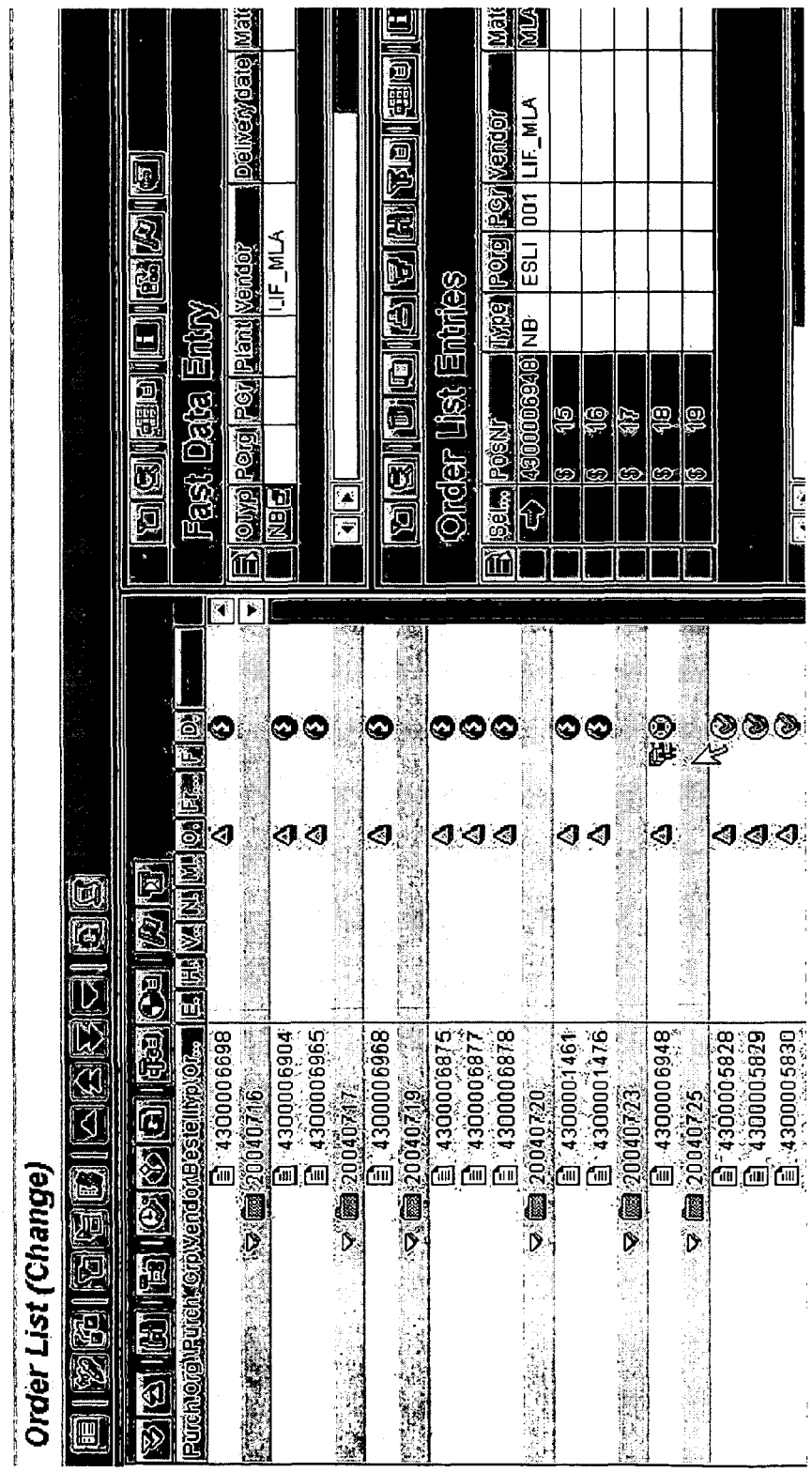
FIG. 9 illustrates status indicator configurations according to another exemplary embodiment.

Status identifier 830 may be any of many possible configurations. In the illustrated embodiment, status identifier 830 consists of three circular areas, wherein each circular area is representative of a different status level, and the current status level is displayed by filling, highlighting, shading, or otherwise denoting the circular area corresponding to the current status (e.g., red, yellow, green colors of the circular areas). In another embodiment, status identifier 830 may include a different number of circular areas to indicate additional or fewer status levels. In yet another embodiment, status identifier 830 may include areas or icons of different shapes (e.g., square areas, triangular areas etc.) for indicating the current status. In yet another embodiment, status identifier 830 may include the use of different colors and/or changes in size or shape or other attributes of the appearance of a single area or icon, or of multiple areas or icons to indicate the current status (e.g., the use of an "X" or "check mark" or other character or symbol to modify the appearance of an area or icon). In yet another embodiment, status identifier 830 may include the use of alphanumeric text, such as a numeric scale (e.g., 1-10) to indicate the current status, wherein the number or other text indicates the current status. In yet another embodiment, a combination of area shapes, icons, colors, and/or alphanumeric text may be used to indicate a number of different possible status levels. Examples of other configurations of status indicators are shown in FIG. 9.

Referring again to FIG. 8, status identifier 830 may also indicate many different types of information. For example, in the illustrated embodiment, status indicator 830 may be used to indicate information as to whether a purchase order has been successfully generated for each line item in purchase order list 800. In this embodiment, a first one of the three circular areas may be used to indicate that a purchase order has been successfully generated for the particular line item, a second one of the three circular areas may be used to indicate that a purchase order has not yet been generated for the particular line item, and a third one of the three circular areas may be used to indicate that there is insufficient budget available to generate a purchase order (e.g., an unsuccessful OTB check). The appropriate circular area may then be filled, e.g., using one of the indication methods described above, to indicate the current status of each line item. For example, in one embodiment, a first one of the three circular areas may be displayed as filled with the color green to indicate that a purchase order has been successfully generated for the particular line item, a second one of the three circular areas may be displayed as filled with the color yellow to indicate that a purchase order has not yet been generated for the particular line item, and a third one of the three circular areas may be displayed as filled with the color red to indicate that there is insufficient budget available to generate a purchase order (e.g., an unsuccessful OTB check). In the illustrated embodiment, the middle circle has been filled to indicate that a purchase order has not yet been generated for each of the ad-hoc line items in purchase order list 800. According to various other embodiments, status identifier 800 may indicate other types of information, such as, for example, OTB information, date control information, allocation table information, firm deal information, release indicator information, etc.

FIG. 10 illustrates the structure of a purchase order list 1000 having status indicators 1030 according to another exemplary embodiment. In the illustrated embodiment, purchase order list 1000 includes a number of line items 1002 and columns 1004a-1004k, which contain the relevant purchasing data associated with each purchase order list line item. Purchase order list 1000 also includes column 1004m, which may contain an individual status identifier 1030 for purchase order list line items 1020 to identify whether a purchase order has been successfully generated for each line item. For example, in the illustrated embodiment a first one of the three circular areas has been identified to indicate that a purchase order has been successfully generated for each line item 1002.

Purchase order list 1000 further includes columns 1004n, 1004p, and 1004q. Column 1004n is labeled "Order No.," and includes the purchase order number of the successfully generated purchase order for each line item 1002 in purchase order list 1000. Column 1004*p* is labeled "PO Item," and includes the item number from a particular purchase order number for each line item 1002 in purchase order list 1000. Column 1004*q* is labeled "Currency," and denotes the type of currency (e.g., euro, dollar, etc.) used in each successfully generated purchase order.

Embodiments within the scope of the present description include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of a process, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A non-transitory computer-readable medium having stored therein instructions that, when executed, cause one or more processors to implement a method of generating a purchase order, the method comprising:

receiving purchasing data for an item to be purchased in a computerized system, the purchasing data including a fixed initial stock-up data, a variable initial stock-up data, and a put-away quantity, wherein the fixed initial stock-up data including a fixed quantity based on store capacity, the variable initial stock-up data including a variable quantity based on store specific requirements including store sales forecast, and the put-away quantity being a quantity which is not shipped directly to a store;

generating by the one or more processors a preliminary purchase order based on received purchasing data for the item to be purchased including the fixed initial stock-up data, the variable initial stock-up data, and the put-away quantity;

determining by the one or more processors whether a sufficient amount of budgeted funds are available for the generation of the purchase order from the preliminary purchase order;

obtaining by the one or more processors an approval for the preliminary purchase order based on the sufficient amount of budgeted funds not being available;

determining by the one or more processors a supplier for the item to be purchased from a plurality of potential suppliers using an automated auction system based on at least one of the sufficient amount of budgeted funds is available and the approval has been obtained;

modifying by the one or more processors the preliminary purchase order to include data from the automated auction system regarding the supplier;

generating by the one or more processors the purchase order based on the modified preliminary purchase order; and storing data related to the purchase order in a business warehouse.

2. The non-transitory computer-readable medium of claim 1, wherein received purchasing data includes a delivery date associated with the item to be purchased.

3. The non-transitory computer-readable medium of claim 1, wherein received purchasing data includes data manually entered by a user.

4. The non-transitory computer-readable medium of claim 1, wherein the supplier is determined by the automated auction system based on bids received from the plurality of suppliers, and wherein each bid includes a price quote for the item to be purchased.

5. The non-transitory computer-readable medium of claim 4, further comprising determining a price for the item to be purchased using the automated auction system.

6. The non-transitory computer-readable medium of claim 5, wherein the price is based on the price quote included in the bid received from the supplier.

7. The non-transitory computer-readable medium of claim 5, further comprising modifying the preliminary purchase order to include the price.

8. The non-transitory computer-readable medium of claim 1, wherein determining whether a sufficient amount of budgeted funds is available for the generation of the purchase order includes applying a budget rule to the preliminary purchase order.

9. The non-transitory computer-readable medium of claim 1, wherein the item to be purchased is one of a retail product and a service.

10. A computer-implemented system for generating a purchase order, the system comprising:

at least one memory;

at least one processor;

an assortment planning system configured to receive purchasing data for an item to be purchased in a computerized system;

an order management system configured to generate a preliminary purchase order based on received purchasing data for the item to be purchased, the preliminary purchase order including an initial vendor, a quantity, a delivery date, and a preliminary price, the preliminary price being a current market price;

the order management system configured to determine whether a sufficient amount of budgeted funds is available for the generation of the purchase order from the preliminary purchase order;

the order management system configured to obtain an approval for the preliminary purchase order based on the sufficient amount of budgeted funds is not available;

an automated auction system configured to determine a supplier for the item to be purchased from a plurality of potential suppliers based on at least one of the sufficient amount of budgeted funds is available and the approval has been obtained;

the order management system configured to modify the preliminary purchase order to include a name of the supplier to replace the initial vendor and an actual price to replace the current market price obtained from the automated auction;

the order management system configured to generate the purchase order based on the modified preliminary purchase order; and a storage system configured to store data related to the purchase order in a business warehouse.

11. The system of claim 10, wherein received purchasing data includes data manually entered by a user.

12. The system of claim 10, wherein the automated auction system is configured to determine the supplier based on bids received from the plurality of suppliers, and wherein each bid includes a price quote for the item to be purchased.

13. The system of claim 12, wherein the automated auction system is further configured to determine a price for the item to be purchased.

14. The system of claim 13, wherein the price is based on the price quote included in the bid received from the supplier.

15. The system of claim 13, wherein the order management system further configured to modify the preliminary purchase order to include the price.

16. The system of claim 10, wherein the order management system further configured to apply a budget rule to the preliminary purchase order in order to determine whether the sufficient amount of budgeted funds is available.

17. The system of claim 10, wherein the item to be purchased is one of a retail product and a service.

18. A non-transitory program product for generating a purchase order, the program product comprising machine-readable program code for causing, when executed, one or more machines to perform the following method steps:

receiving purchasing data for an item to be purchased in a computerized system, the purchasing data including a fixed initial stock-up data, a variable initial stock-up data, and a put-away quantity, wherein the fixed initial stock-up data including a fixed quantity based on store capacity, the variable initial stock-up data including a variable quantity based on store specific requirements including store sales forecast, and the put-away quantity being a quantity which is not shipped directly to a store;

generating a preliminary purchase order based on received purchasing data for the item to be purchased including the fixed initial stock-up data, the variable initial stock-up data, and the put-away quantity;

determining whether a sufficient amount of budgeted funds are available for the generation of the purchase order from the preliminary purchase order;

obtaining an approval for the preliminary purchase order based on the sufficient amount of budgeted funds not being available;

determining a supplier for the item to be purchased from a plurality of potential suppliers using an automated auction system based on at least one of the sufficient amount of budgeted funds is available and the approval has been obtained;

modifying the preliminary purchase order to include data from the automated auction regarding the supplier;

generating the purchase order based on the modified preliminary purchase order; and storing data related to the purchase order in a business warehouse.

19. The non-transitory program product of claim 18, wherein received purchasing data includes a delivery date associated with the item to be purchased.

20. The non-transitory program product of claim 18, wherein received purchasing data includes data manually entered by a user.

21. The non-transitory program product of claim 18, wherein the supplier is determined by the automated auction system based on bids received from the plurality of suppliers, and wherein each bid includes a price quote for the item to be purchased.

22. The non-transitory program product of claim 21, further comprising machine-readable program code for causing, when executed, the one or more machines to perform the method step of determining a price for the item to be purchased using the automated auction system.

23. The non-transitory program product of claim 22, wherein the price is based on the price quote included in the bid received from the supplier.

24. The non-transitory program product of claim 22, further comprising machine-readable program code for causing, when executed, the one or more machines to perform the method step of modifying the preliminary purchase order to include the price.

25. The non-transitory program product of claim 18, wherein the machine-readable program code is configured to determine whether a sufficient amount of budgeted funds is available for the generation of the purchase order by applying a budget rule to the preliminary purchase order.

26. The non-transitory program product of claim 18, wherein the item to be purchased is one of a retail product and a service.

* * * * *